United States Patent [19]

Suzki

[11] 4,367,009
[45] Jan. 4, 1983

[54] OPTICAL SCANNING APPARATUS WITH BEAM SPLITTER TO PROVIDE PLURAL LIGHT BEAMS

[75] Inventor: Akiyoshi Suzki, Tokyo, Japan

[73] Assignee: Canon Kabushiki Kaisha, Tokyo, Japan

[21] Appl. No.: 230,502

[22] Filed: Feb. 2, 1981

Related U.S. Application Data

[63] Continuation of Ser. No. 43,267, May 29, 1979, abandoned, which is a continuation-in-part of Ser. No. 871,763, Jan. 23, 1978, abandoned.

[30] Foreign Application Priority Data

Jan. 21, 1977 [JP] Japan ................................. 52/5501
Jan. 20, 1978 [DE] Fed. Rep. of Germany ....... 2802417
Jan. 20, 1978 [DE] Fed. Rep. of Germany ... 7801680[U]

[51] Int. Cl.³ ...................... G02B 27/17; G02B 27/10
[52] U.S. Cl. ................................. 350/6.5; 350/169
[58] Field of Search ................ 350/6.1, 6.91, 484, 350/485, 486, 358, 174, 173, 169, 171; 250/235, 236, 560, 563; 356/380, 386, 387, 390; 358/206; 346/108

[56] References Cited

U.S. PATENT DOCUMENTS

| | | | |
|---|---|---|---|
| Re. 29,670 | 6/1978 | Spaulding | 350/174 |
| 3,708,794 | 1/1973 | Solomon et al. | 350/174 |
| 3,853,406 | 12/1974 | Zahoni | 356/387 |
| 3,854,052 | 12/1974 | Asar et al. | 356/387 |
| 4,000,493 | 12/1976 | Spaulding et al. | 350/358 |
| 4,013,367 | 3/1977 | Nagao et al. | 350/6.9 |

Primary Examiner—Jon W. Henry
Attorney, Agent, or Firm—Fitzpatrick, Cella, Harper & Scinto

[57] ABSTRACT

A scanning apparatus for obtaining plural scanning beams, wherein plural stationary light beams are incident upon a deflecting reflection surface in different directions, but they are superposed with each other on the reflection surface. Plural scanning beams are provided from the deflecting reflection surface. Since the plural beams are superposed on the reflection surface, the center of deflection is the same for all of the light beams, so that the scanning beams are easily processed by a single optical system.

3 Claims, 23 Drawing Figures

OPTICAL SCANNING APPARATUS WITH BEAM SPLITTER TO PROVIDE PLURAL LIGHT BEAMS

This is a continuation, of application Ser. No. 043,267, filed May 29, 1979, (35.C943A) now abandoned; which in turn was a continuation-in-part of application Ser. No. 871,763, filed Jan. 23, 1978, now abandoned (35.C943).

BACKGROUND OF THE INVENTION

1. Field of the Invention

The present invention relates to a scanning apparatus for providing a plurality of scanning beams.

2. Description of the Prior Art

In an attempt to obtain plural scanning beams with the use of a single scanner, the possibilities are, to split a single scanning beam coming from the scanner into plural scanning beams, and to direct plural stationary beams to a scanner in different directions. The present invention is concerned with the latter method.

If, in such a case as the present invention is concerned, plural beams impinge upon the deflecting surface of the scanner in different directions without superposition therebetween, the centers of deflection of the scanning beams are different from each other. There is a difficulty in optically processing such scanning beams, for example, imaging these scanning beams on a surface to be scanned, by means of a single scanning lens. Generally speaking, in an optical system for handling a scanning beam, the center of deflection and the entrance pupil of the optical system coincide. If the scanning beams having different centers of deflection are handled by the optical system, it means that the entrance pupil becomes larger, that is, the F-number becomes smaller, thus making the designing of the optical system more difficult.

SUMMARY OF THE INVENTION

Accordingly, the object of the present invention is to provide a scanning apparatus which provides plural scanning beams having the same center of deflection.

The object is achieved, according to the present invention, by directing stationary beams of different incidence directions to the deflecting surface of the scanner so as to be in superposed relationship with each other. Thus, a plurality of scanning beams having the same center of deflection is provided, so that the center of deflection of each of the beams can be coincident with the center of the entrance pupil, thus making the design of the optical system practically easier.

The other objects, advantages, features and uses will become more apparent as the description proceeds, when considered with the accompanying drawings.

DESCRIPTION OF THE PREFERRED EMBODIMENTS

Figure 1A:
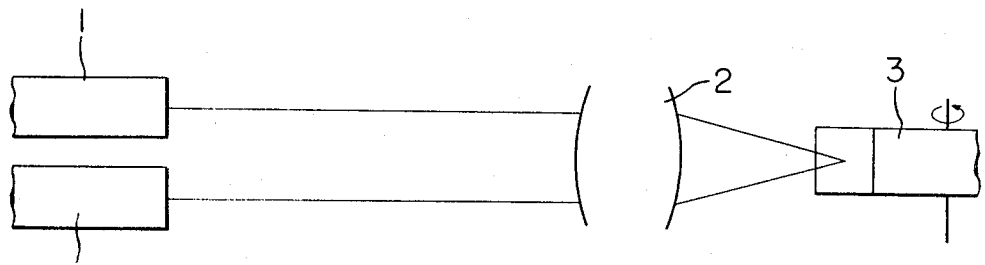
FIGS. 1(a) and 1(b) are schematic diagrams of optical systems for superposing the beams coming from plural light sources at a reflecting surface of a scanner.
Figure 1B:
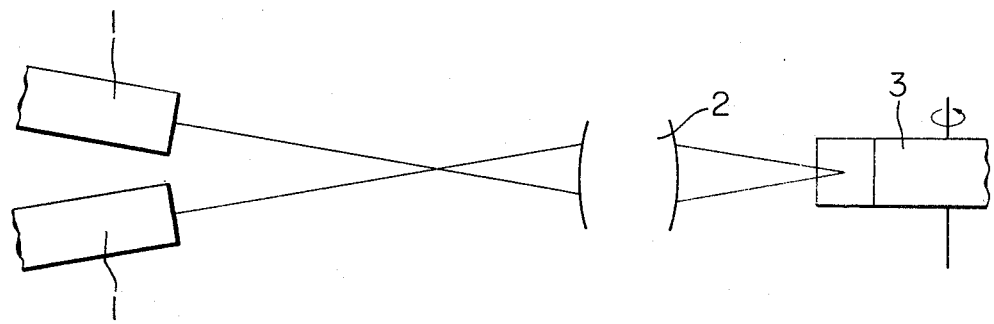
Figure 2A:
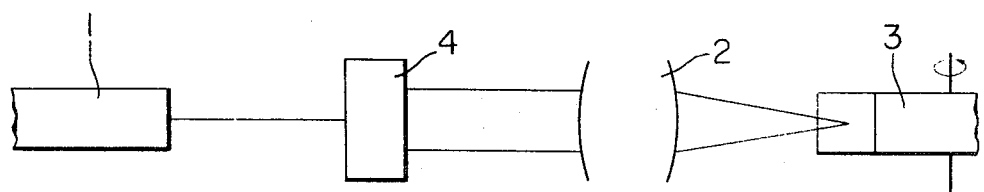
FIGS. 2(a) and 2(b) show optical systems for superposing the divided beams at a reflecting surface of a scanner.
Figure 2B:
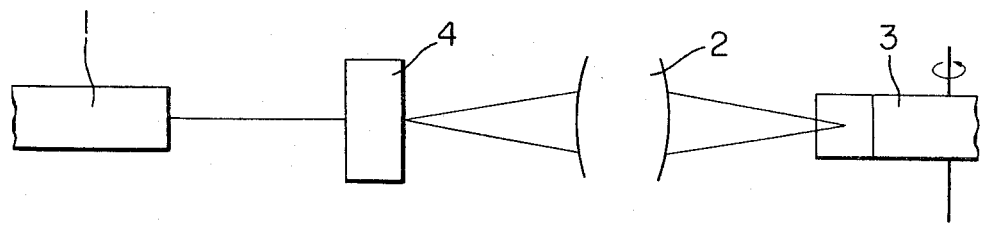

FIGS. 1(a) and 1(b) relate to the case where the two stationary beams from two respective light sources are superposed at a surface of a rotatory polygonal mirror. FIGS. 2(a) and 2(b) relate to the case where the two stationary beams which have been provided by dividing a beam from a single light source, are superposed at a surface of a rotatory polygonal mirror. In these Figures, designated by reference numerals 1, 2 and 3 are a laser beam source, lens and rotatory polygonal mirror, respectively.

In the arrangement shown in FIG. 1(a), the two beams coming from the laser beam sources are directed substantially in parallel with each other, and they are superposed with each other upon the surface of the rotatory polygonal mirror. The second focal plane of the lens 2 is coincident with the deflecting surface of the polygonal mirror. In the arrangement shown in FIG. 1(b), the two beams are superposed by the lens 2 upon the polygonal mirror, after they have crossed each other. The point of crossing is in conjugation with the deflecting surface of the polygonal mirror with respect to the lens 2.

In FIGS. 2(a) and 2(b), reference numeral 4 depicts a beam splitter, which provides two stationary beams by splitting a single beam. The thus provided two beams are superposed with each other upon the polygonal mirror, similarly to the case of FIG. 1(a). In the system shown in FIG. 2(b), the point of split by the beam splitter is in conjugation with the deflecting surface of the polygonal mirror with respect to the lens 2 so that the two stationary beams coincide.

FIGS. 3(a), (b) and 4(a), (b), (c) and (d) show beam splitters available for this purpose. FIGS. 3(a) and 3(b) show beam splitters using a half-mirror. The beam splitter of FIG. 3(a) includes a half-mirror BS inclined at the angle of 45° and a reflecting mirror M. The beam splitter of FIG. 3(b) includes prisms and a half-mirror interposed therebetween. FIGS. 4(a) to 4(c) show polarization beam splitters which utilize a Wollaston prism, a Savart plate and a Rochon prism, respectively. FIG. 4(d) illustrates an example employing a crystal plate which is cut out so that the optical axis thereof is inclined with respect to the surface thereof.

As will be understood from the foregoing explanation, the stationary beams may be (1) parallel with each other or (2) not parallel. On the other hand, a stationary beam may be (1) afocal, (2) diverging or (3) converging. Therefore, there are 6 (=2×3) combinations possible. The present specification explains, as typical examples, the case where a beam splitter is used for providing parallel beams, and the case where a Wollaston prism is used for providing non-parallel beams.

Figure 5:
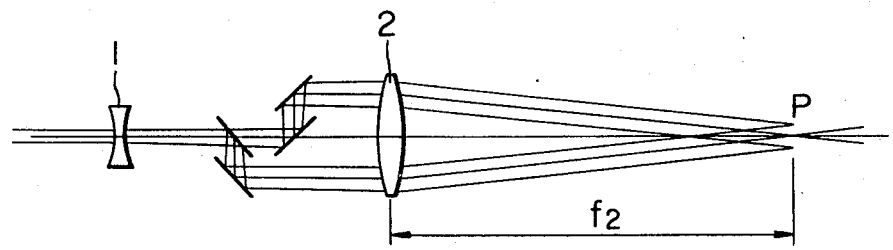
FIGS. 5(a), 5(b), 6(a), 6(b), 7(a) and 7(b) are schematic diagrams of specific examples for superposing divided beams.
Figure 5:
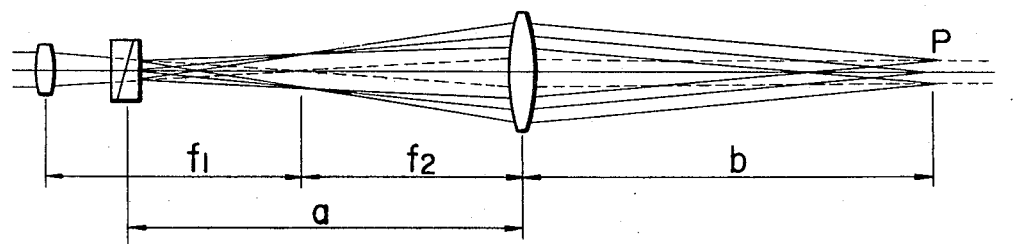

FIGS. 5(a), 6(a) and 7(a) show the case in which the output beams of the splitting means are parallel, whereas FIG. 5(b), 6(b) and 7(b) are concerned with the case in which the beams are not parallel. The general construction is such that the beam splitting means is interposed between a lens 1 having a focal length $f_1$ and a lens 2 having a focal length $f_2$. In FIG. 5(a), the combination of the lens 1 and the lens 2 constitutes an afocal optical system, so that the parallel light beam incident on the lens 1 remains parallel after it has passed through the lens 2. Although the lens 1 is shown as a concave lens, a convex lens may be used instead of the concave lens if the system is modified to that similar to the FIG. 5(b) structure. In the latter case, the second focal point of the lens 1 is coincident with the first focal point of the lens 2.

The surface of the polygonal mirror is shown by reference character P. Since the beams incident on the lens 2 are in parallel, the surface P is coincident with the second focal plane of the lens 2. This relationship holds true in the embodiments of FIGS. 6(a) and 7(a).

In FIG. 5(b), on the other hand, the position of the Wollaston prism, which is the splitting point, is in conjugation with the surface P of the polygonal mirror. That is to say, the following equation is satisfied:

$$\frac{1}{a} + \frac{1}{b} = \frac{1}{f_2}$$

The beams into which a single beam has been divided by the beam splitter meet on the surface P of the polygonal mirror. In the embodiment of FIG. 5(b), the lens 1 and the lens 2 are so arranged that the second focal plane of the lens 1 is coincident with the first focal plane of the lens 2, whereby the beam incident on the polygonal mirror is afocal.

The arrangements of FIGS. 6(a), 6(b) and 7(a), 7(b) are generally similar to those of FIGS. 5(a), 5(b), except that the power of the lens 1 disposed forwardly is changed so that the beam incident on the polygonal mirror is converging or diverging. Since the superposition onto the polygonal mirror is effected only by the lens 2, the lens 1 can be freely changed to alter the condition of the beam incident on the polygonal mirror. As an extreme example, the lens 1 can have no power, or it can be omitted, as shown in FIG. 6(b). Of course, if a lens 1 is placed before the Wollaston prism, the image formation point A can be freely displaced from the focal point A of the lens 2, and for this reason, it is not necessary to omit the lens 1.

With the arrangement of FIG. 7(b), the Wollaston prism, point A, and the surface of the polygonal mirror, point B, are in conjugation with each other, that is;

$$\frac{1}{a_i} + \frac{1}{b_i} = \frac{1}{f_2} \quad (i = 1,2)$$

Figure 3:
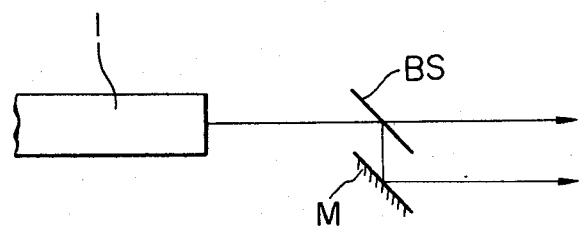
FIGS. 3(a) and 3(b) and FIGS. 4(a), 4(b), 4(c) and 4(d) show examples of beam splitters usable for the optical system of FIGS. 2(a) and 2(b)
Figure 3:
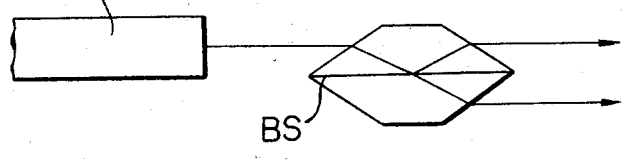
Figure 4:
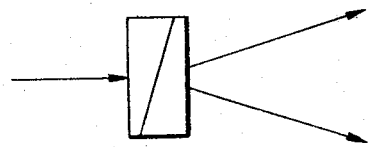
Figure 4:
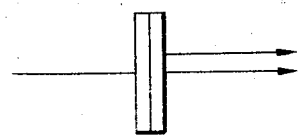
Figure 4:
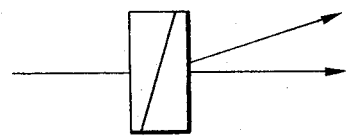
Figure 4:
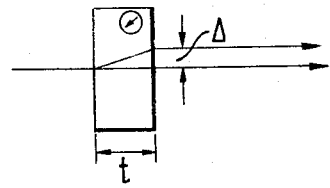

It is a matter of course that the beam dividing means usable with FIGS. 5(a)–5(b), 6(a)–6(b) and 7(a)–7(b) embodiments are not limited to the beam splitters or Wollaston prisms, but the other beam splitting systems or polarizing elements, such as shown in FIGS. 3 and 4, are also satisfactory.

The systems usable with the case of employing plural light sources can be analogized from the foregoing explanation. When the beams are parallel, the lens 1 is incorporated for each of the light sources, whereas, when not parallel, the cross point therebetween is regarded as the point of the Wollaston prism of FIGS. 5–7 embodiments.

Figure 11:
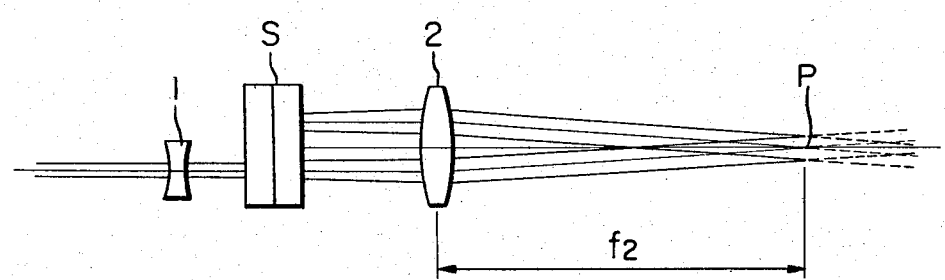
FIGS. 11(a), 11(b) and 11(c) are schematic diagrams of other examples.
Figure 11:
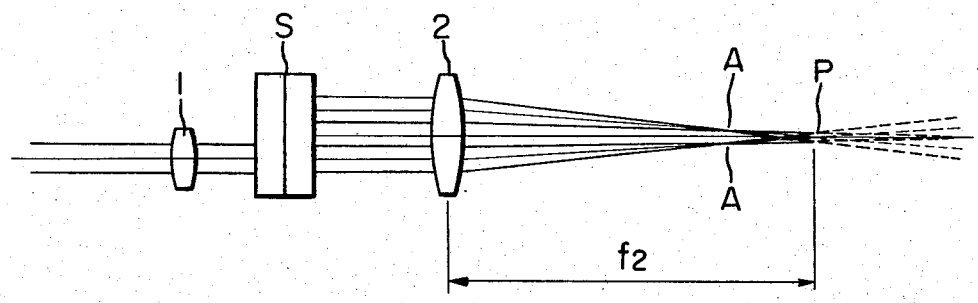
Figure 11:
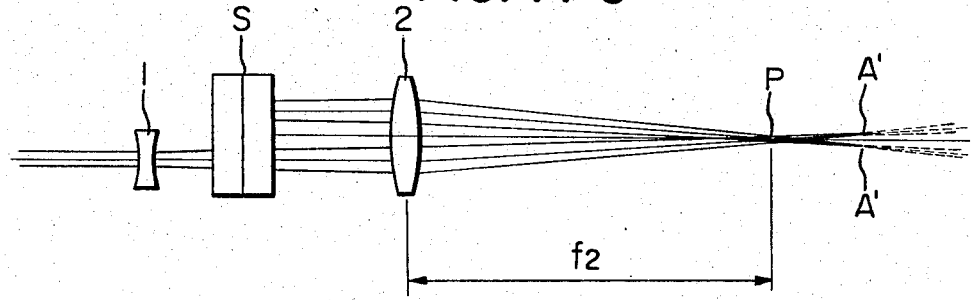

FIGS. 11(a)–11(c) show the arrangement wherein an optical element having a crystal light device divides the incident beam into plural beams which are in translational relationship with each other. FIGS. 11(a), 11(b) and 11(c) correspond to FIGS. 5(a), 6(a) and 7(a). In FIGS. 11(a), 11(b) and 11(c), the optical element is shown as a Savart plate S. Similarly to the foregoing embodiments, the point of reflection P is at the focal point of the second lens 2, and the state of light incident on the polygonal surface is controlled by the power of the first lens 1. With the Savart plate, the emergent beams are asymmetrical with respect to the incident beam, however, the beams incident on the polygonal surface can be made symmetrical with respect to the optical axis by offsetting the first lens 1 and the second lens 2, as shown in FIGS. 11(a)–(c).

As analyzed above, it is relatively easy to accord the polygonal mirror surface which is the pupil point of the total system with the center of deflection. The method of handling a plurality of beams is very effective in various fields, such as, measurement, simultaneous observation of two things and recording technique. The optical system is of advantage in performing these, since every beam uses the center of the pupil. Generally speaking, the plural beams are substantially equal in their density.

As for a more specific example, the explanation will now be made with respect to the case where the present invention is applied to an automatic alignment for producing IC (Integral Circuit). The automatic alignment is effected for the purpose of two-dimensional registration between a mask which has an original pattern and a wafer to which the original pattern is applied. The mask and the wafer are each provided with a special mark called alignment mark. The alignment is accomplished by registering these marks under a predetermined relationship. The alignment, which requires the accuracy in the order of micron or sub-micron, naturally necessiates the observation at plural points. Generally, two points observation is adopted, since one point observation is not sufficient to cover the rotational degree of freedom. Therefore, the mask and the wafer each have two marks at different positions. In order to take up the information from the two positions, two microscopes are used for constituting an observation optical system, so-called alignmentscope. In the case of step-and-repeat printing method, twice as many marks as the number of the steps are provided in the wafer. In an automatic alignment system, generally, a part of the optical system thereof is commonly used for the alignmentscope so that the alignment marks observed by the microscope are scanned, or the light intensity is balanced to provide an electric signal which is led into a predetermined relationship to complete alignment operation.

Many kinds of automatic alignment systems have recently been proposed. One of them is disclosed in U.S. patent application Ser. No. 790,072, now U.S. Pat. No. 4,199,219 which has been assigned to the assignee of the present application. According to this earlier application, the mask and the wafer are scanned with a laser beam spot. The present invention is advantageously applicable to such a system. Since the scanning method is adopted, the scanner, which necessarily includes a moving part, is inevitable. In view of the facts that the scanning operation has to be effected to two positions having the respective alignment marks, and that, for the purpose of making the apparatus compact, a single scanner is desirably employed, the present invention is greatly advantageous in that it enables to scan with plural beams using a single scanner.

Figure 8:
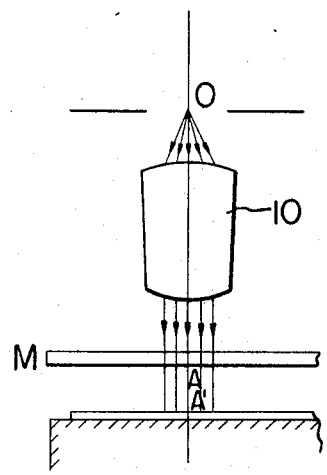
FIGS. 8(a) and 8(b) show a telecentric optical system receiving different incident beams.
Figure 8:
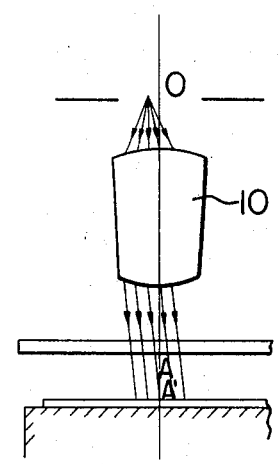

In addition to such a structural advantage and the advantage in the design of the lens described hereinbefore, it provides a great merit in the case of a contact method or a proximity method, since the beam can be introduced to the center of the pupil of the microscope. With the contact method or the proximity method, the mask and the wafer are placed apart from each other at the distance of several ten microns during the alignment operation. If, therefore, the incident beam is inclined with respect to the surface of the mask or wafer, then the two objects are observed obliquely, as shown in FIGS. 8(a) and 8(b). In FIG. 8(a) where the scanning beam is originated at the center of pupil 0, the beam passed through the objective lens 10 is directed in parallel with the optical axis, thus impinging upon the mask surface and the wafer surface perpendicularly. In such an occasion, there is no observation error. On the other hand, FIG. 8(b) illustrates the case in which the scanning beam is originated at a point out of the center of pupil 0. With this, the beam passed through the objective lens is incident on the surface with an inclination which corresponds to the deviation of the point of origin from the enter of pupil. When a point A of the mask is in right registration with a point A' of the wafer, the FIG. 8(a) arrangement detects that they are in registration, but the FIG. 8(b) arrangement regards it as misregistration. For these reasons, the point of the origin of the beam has to be in registration with the pupil within an appropriate tolerance.

Figure 6:
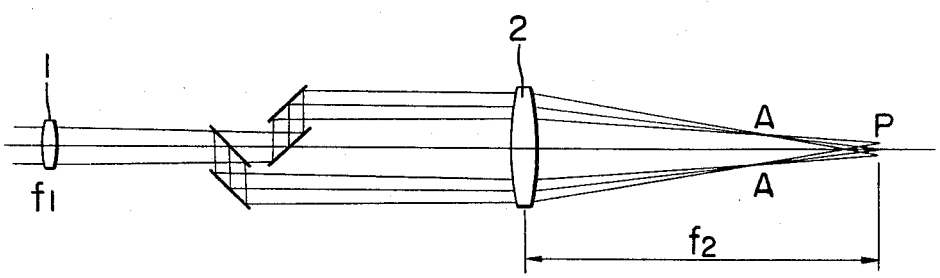
Figure 6:
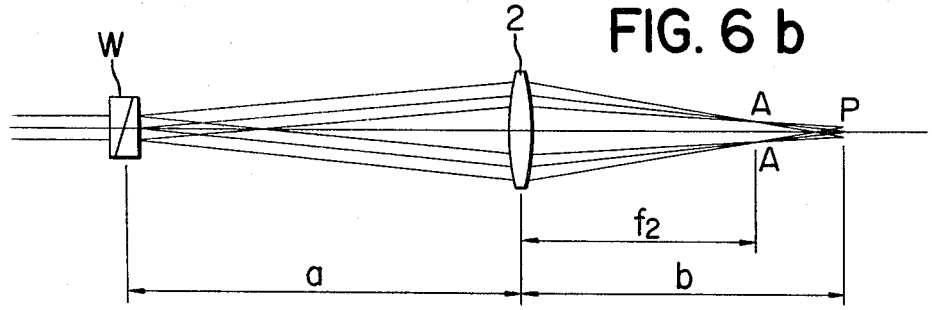
Figure 7:
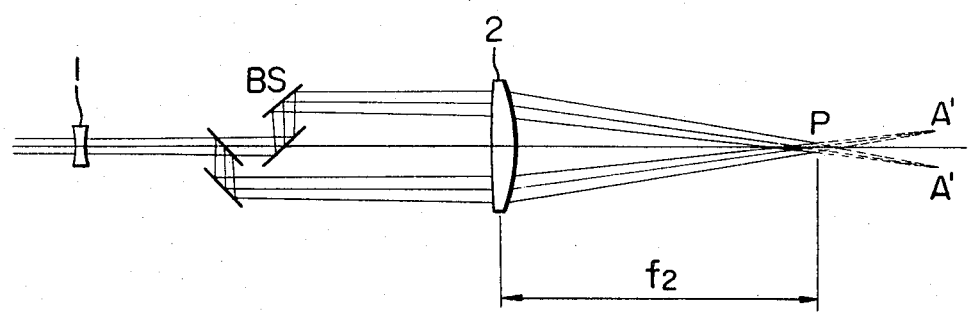
Figure 7:
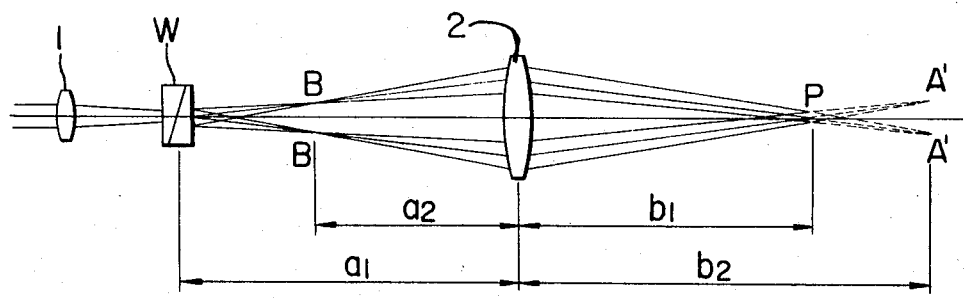
Figure 9:
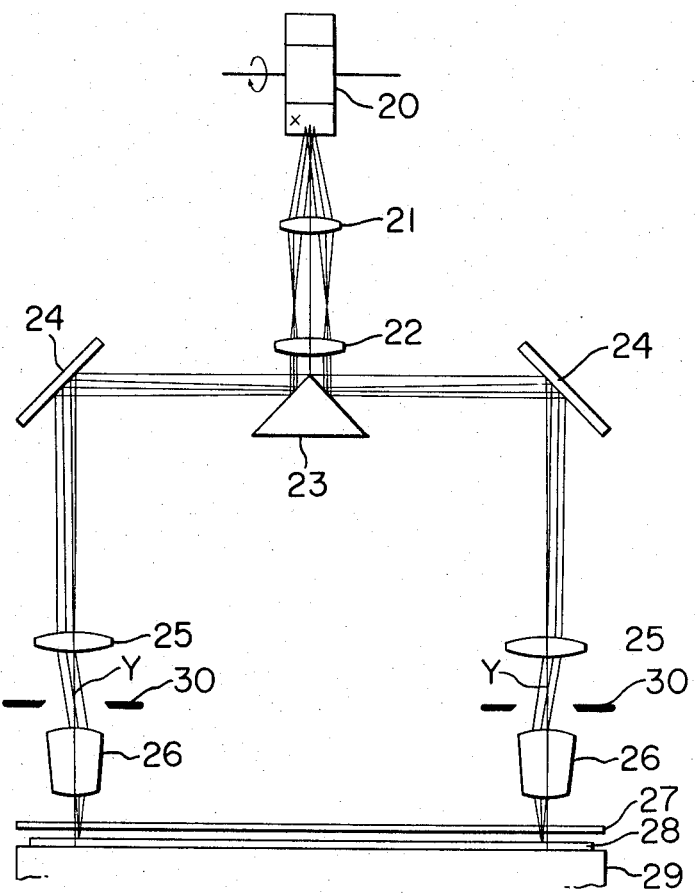
FIG. 9 is a schematic diagram of an embodiment wherein the scanning apparatus of the present invention is utilized in application of image pattern of light in the process of manufacturing semiconductors.

FIG. 9 shows an example wherein the present application is incorporated into the automatic aligner. The optical system before the polygonal mirror 20 once converges the beam before the polygonal mirror, as shown in FIG. 6, and then it impinges upon the polygonal mirror in the form of diverging beam. The entrance optical system is in the plane vertical to the sheet of the Figure. The image formation lens 21 reproduces an image, adjacent to a field lens 22, from an image once formed by the laser beam before it reaches the polygonal mirror. The prism mirror 23 directs the two beams toward right and left microscope objectives 26. Therefore, the prism mirror 23 is desirably disposed in the vicinity of a position where the image of the beam is reproduced. The two beams separated by the prism mirror 23, go through the respective relay lens 25 and the respective objective lens 26 to scan the mask 27 and the wafer 28, respectively. As described above, in order to direct the scanning beam perpendicularly to the surfaces of the mask and the wafer supported with a clearance therebetween, the center of the pupil plane of the objective lens 26 functions as the origin of the beam. This condition is satisfied by disposing the pupil center Y in conjugation with the reflecting point X of the beam at the polygonal mirror, the point Y being the actual point of origin. While the optical means 21 and 22 are common to the two beams, the optical means after the prism mirror 23 are provided for the respective beams. Since, however, the beams are in coincidence with each other at the reflecting point X of the polygonal mirror, and moreover, they are on the optical axis, it is possible to introduce the beams simultaneously to the centers of pupil at the right and left pupil planes 30. The beams reflected by the mask and the wafer are received by unshown photoelectric detectors. At this time, under the principle of a telecentric optical system, the incident beam goes back, if the surface is flat, along the incidnet line to pass through the center of pupil Y, again. Maintaining the reflecting point X of the polygonal mirror in conjugation with the center of pupil Y results in that the direct beam passing through the pupil does not move. This is advantageous when an optical system is constructed so as to cut the direct beam and take up only scattered light. The automatic aligner using a plurality of beams can be said to be a typical example of a multichannel information processing. Where a crystal element, as shown in FIG. 6(b), is employed as an optical system before the polygonal mirror 20, each of the two beams are linearly polarized in the directions orthogonally crossing each other, so that if the optical system thereafter includes a beam splitter, the polarization characteristics are influential. If a view finding optical system, a light source therefor or a photoelectric detector (not shown) is incorporated into the arrangement of FIG. 9, it is not avoidable to add several or many beam splitters. For example, it is conceived that the mirror 24 is replaced with a beam splitter to lead the beams to photoelectric detector means. If, in such a case, the polarization makes some trouble, it is better to place a $\lambda/4$ plate after the crystal, whereby the beams of the same intensity are provided in both of the view finders. When a laser beam linearly polarized is used as the light source, a special attention should be paid to the positional relation between the crystal and the direction of the polarization of the laser beam, or a $\lambda/4$ plate may be placed to the laser beam output.

Figure 10:
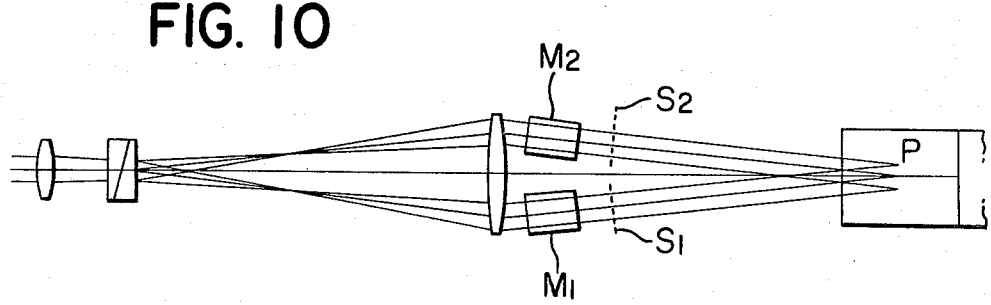
FIG. 10 shows an embodiment wherein the scanning apparatus of the present invention is applied to a laser beam printer.

Although the application of the optical system is explained in detail with respect to an automatic aligner, it is widely applicable to the other systems. For example, a laser beam printer which scans with double beams modulated respectively can scan two lines simultaneously, which means that the printing speed is doubled. This is illustrated in FIG. 10, wherein the arrangement is analogous to that of FIG. 5(b). But, the arrangement here is provided with modulators $M_1$ and $M_2$. In addition in this arrangement, diffraction light is incident on the polygonal mirror, with the direct light is cut. Designated by reference numerals $S_1$ and $S_2$ are stoppers for blocking the direct light. The beam from the polygonal mirror is introduced to an f-$\theta$ lens means. By applying to the modulators $M_1$ and $M_2$ pieces of information for the adjacent two lines, the printing is possible simultaneously to the two lines.

While there has been described what is at present considered to be the preferred embodiment of the invention, it will be understood that various modifications may be made therein, and it is intended to cover in the appended claims all such modifications as fall within the true spirit and scope of the invention.

What I claim is:
1. An optical scanning apparatus comprising:
   a light source;
   a beam splitter for dividing a light beam from said light source into plural light beams directed in parallel with each other;
   a lens system interposed between said light source and said beam splitter for controlling the condition of the light beam incident upon said beam splitter;
   lens means upon which said plural light beams impinge, said lens means having an optical axis parallel to the direction of said plural light beams, wherein the optical path length of the plural light beams incident on said lens means are all the same; and a deflector disposed in the second focal plane of and on the optical axis of said lens means and having a deflecting surface pivotable around an axis.

2. An optical scanning apparatus comprising:

a light source;

a beam splitter for dividing a light beam from said light source into plural light beams directed in different directions from a splitting point;

lens means upon which said plural light beams impinge; and a deflector disposed conjugate with said beam splitting point with respect to said lens means and having a deflecting surface pivotable around an axis.

3. Apparatus according to claim 2, wherein a lens system is interposed between said light source and said beam splitter for controlling the condition of the light beam incident upon said beam splitter.

* * * * *